(12) United States Patent
Jung et al.

(10) Patent No.: US 10,315,942 B2
(45) Date of Patent: Jun. 11, 2019

(54) RESOURCE REUSE-TYPE INDUSTRIAL WASTE WATER TREATMENT METHOD AND APPARATUS UTILIZING OXIDIZING AGENT GENERATED BY UTILIZING WASTE WATER

(71) Applicant: Techwin Co, Ltd., Cheongju, Chungcheongbuk-do (KR)

(72) Inventors: Boong Ik Jung, Chungcheongbuk-do (KR); Jung Sik Kim, Chungcheongbuk-do (KR); Do Won Jung, Seoul (KR); Chang Bok Lee, Incheon (KR); Seong Cheol Han, Gyeonggi-do (KR); Sung Hwan Jang, Busan (KR)

(73) Assignee: Techwin Co, Ltd., Cheongju, Chungcheongbuk-do (KR)

( * ) Notice: Subject to any disclaimer, the term of this patent is extended or adjusted under 35 U.S.C. 154(b) by 280 days.

(21) Appl. No.: 15/390,444

(22) Filed: Dec. 23, 2016

(65) Prior Publication Data

US 2017/0107137 A1 Apr. 20, 2017

Related U.S. Application Data (63) Continuation of application No. PCT/KR2015/006732, filed on Jun. 30, 2015.

(30) Foreign Application Priority Data

Sep. 24, 2014 (KR) .................. 10-2014-0127601

(51) Int. Cl.
*C02F 1/20* (2006.01)
*C02F 1/42* (2006.01)
(Continued)

(52) U.S. Cl.
CPC ................ *C02F 9/00* (2013.01); *C25B 1/285* (2013.01); *C25B 9/10* (2013.01); *C02F 1/20* (2013.01);
(Continued)

(58) Field of Classification Search
CPC .... C02F 1/20; C02F 1/42; C02F 1/461; C02F 1/52; C02F 1/5236; C02F 1/56;
(Continued)

(56) References Cited

U.S. PATENT DOCUMENTS 6,491,807 B2   12/2002   Kimizuka et al.
2003/0132124 A1   7/2003   Hiro et al.

FOREIGN PATENT DOCUMENTS

JP   1994-205944 A   7/1994
JP   09-010779 A   1/1997
(Continued)

OTHER PUBLICATIONS

Machine translation of KR 10-2001-0045087 to Wy et al. (2002) (obtained from KIPO Nov. 2018) (Year: 2002).*

*Primary Examiner* — Lucas A Stelling
(74) *Attorney, Agent, or Firm* — Mintz Levin Cohn Ferris Glovsky and Popeo, P.C.; Kongsik Kim; Jhongwoo Jay Peck (57) ABSTRACT

This invention relates to a resource-recycling type method and apparatus for treating industrial wastewater using an oxidizing agent produced from wastewater, wherein, in the treatment of industrial wastewater containing nitrogen compounds and refractory COD-causing pollutants, an oxidizing agent is autonomously produced using ammonia gas stripped from wastewater and is then added back to the wastewater, thus economically treating the wastewater without the need to purchase an expensive oxidizing agent. This wastewater treatment method, suitable for use in decreasing (Continued)

amounts of nitrogen pollutants (T-N), including ethanolamine compounds and ammonia nitrogen ($NH_3$—N), and refractory COD-causing pollutants in industrial wastewater, includes: stripping ammonia from raw wastewater, producing an oxidizing agent via addition of sulfuric acid to the stripped ammonia, electrolysis and addition of sodium hydroxide, and performing chemical treatment by adding the produced oxidizing agent back to the raw wastewater from which ammonia was stripped, thus removing the nitrogen pollutants (T-N) and the refractory COD-causing pollutants, and the apparatus used to perform the wastewater treatment method is also provided.

15 Claims, 8 Drawing Sheets (51) Int. Cl.
| | | |
|---|---|---|
| C02F 1/46 | (2006.01) | |
| C02F 1/52 | (2006.01) | |
| C02F 1/56 | (2006.01) | |
| C02F 1/66 | (2006.01) | |
| C02F 1/72 | (2006.01) | |
| C02F 1/78 | (2006.01) | |
| C25B 1/28 | (2006.01) | |
| C25B 9/10 | (2006.01) | |
| C02F 9/00 | (2006.01) | |
| C02F 101/16 | (2006.01) | |
| C02F 101/38 | (2006.01) | |
| C02F 1/461 | (2006.01) | |
| C02F 101/34 | (2006.01) | |
| C02F 103/28 | (2006.01) | |

(52) U.S. Cl.
CPC ............... *C02F 1/42* (2013.01); *C02F 1/461* (2013.01); *C02F 1/52* (2013.01); *C02F 1/5236* (2013.01); *C02F 1/56* (2013.01); *C02F 1/66* (2013.01); *C02F 1/72* (2013.01); *C02F 1/78* (2013.01); *C02F 2001/46133* (2013.01); *C02F 2001/46147* (2013.01); *C02F 2101/16* (2013.01); *C02F 2101/345* (2013.01); *C02F 2101/38* (2013.01); *C02F 2103/28* (2013.01); *C02F 2201/46115* (2013.01); *C02F 2305/02* (2013.01)

(58) Field of Classification Search
CPC ...... C02F 1/66; C02F 1/72; C02F 1/78; C02F 9/00; C02F 2001/46133; C02F 2001/46147; C02F 2101/16; C02F 2101/345; C02F 2101/38; C02F 2103/28; C02F 2201/46115; C02F 2305/02; C25B 1/285; C25B 9/10
See application file for complete search history.

(56) References Cited

FOREIGN PATENT DOCUMENTS

| KR | 10-2001-0045807 A | 6/2001 |
|---|---|---|
| KR | 10-2004-0000789 A | 1/2004 |
| KR | 10-2012-0078819 A | 7/2012 |

* cited by examiner

FIG.8

RESOURCE REUSE-TYPE INDUSTRIAL WASTE WATER TREATMENT METHOD AND APPARATUS UTILIZING OXIDIZING AGENT GENERATED BY UTILIZING WASTE WATER

CROSS-REFERENCE TO RELATED APPLICATIONS

This application is a continuation application if International Application No. PCT/KR2015/006732 filed on Jun. 30, 2015, which claims priority to Korean Application No. 10-2014-0127601 filed on Sep. 24, 2014. The applications are incorporated herein by reference.

TECHNICAL FIELD

The present invention relates to a resource-recycling-type method and apparatus for treating industrial wastewater using an oxidizing agent produced from wastewater and, more particularly, to a resource-recycling-type method and apparatus for treating industrial wastewater, wherein in the treatment of industrial wastewater containing nitrogen compounds and refractory COD (Chemical Oxygen Demand)-causing pollutants, an oxidizing agent is autonomously produced using ammonia gas stripped from wastewater and is then added back to the wastewater, so that chemical treatment is carried out.

BACKGROUND ART

The development of industry has an inseparable relationship with the treatment of industrial wastewater essentially occurring therefrom, and techniques for treating industrial wastewater are continually advanced with the development of industry.

Many attempts have been made to solve environmental pollution problems due to increased amounts of refractory COD-causing pollutants, which are not degraded in the natural environment and are difficult to decompose even using biological treatment processes such as active sludge processes. Such refractory COD-causing pollutants may include aromatic benzene ring compounds, such as chlorobenzene, nitrobenzene, decahydronaphthalene, benzene, cresol, xylene, tetrahydronaphthalene, tetrahydrofuran, toluene, phenol, ethylphenol, ethylbenzene, and pyridine, and halogenated organic compounds, such as trichloroethylene, tetrachloroethylene, perchloroethylene, and pentachlorophenol, and are contained in large amounts in various kinds of industrial wastewater, including wastewater from fiber-dyeing or paper-making processes.

In the case of nuclear power plants, ethanolamine (ETA) wastewater, which contains sulfuric acid and high-concentration organic materials generated upon operating a condensate polishing plant (CPP), is mixed with other kinds of system water, transferred to a wastewater disposal facility, subjected to physicochemical treatment including coagulation and precipitation, and then filtered.

However, COD (Chemical Oxygen Demand) and T-N (Total Nitrogen) pollutants from the ethanolamine compounds generated upon operation of CPP have not yet been effectively treated, and there is a need to develop treatment methods thereof, which may actively respond to environmental laws that are expected to become more stringent in the future.

Examples of chemicals currently useful as the pH controller in secondary system water of nuclear power plants may include ammonia, morpholine, and ethanolamine (ETA). However, ethanolamine, rather than ammonia, is used as the pH controller in not only domestic but also foreign nuclear power plants. Even when ethanolamine is used in a small amount under conditions of high temperature and high pressure, a high pH may be maintained, and thus the load of a condensate polishing plant (CPP) may be decreased, and a cation exchange resin has high sodium selectivity in an amine mode to thus minimize the introduction of sodium into a vapor generator and the corrosion of the vapor generator. The use of ethanolamine as the pH controller in place of ammonia is continuously increasing at present.

When ethanolamine is used in this way, however, COD and T-N in the effluent originating from wastewater generated upon the operation of CPP are increased. The system water, which circulates in the secondary system, is periodically regenerated to remove impurities using the ion exchange resin of CPP. As such, compounds such as ethanolamine or hydrazine and ionic materials in the system water are discharged together. The compounds, ranging in concentration from hundreds to thousands of ppm, contain large amounts of nitrogen compounds and organic materials, and are expressed as COD or T-N.

Conventional methods of lowering COD by treating the refractory pollutants include physicochemical treatment methods and biological treatment methods.

Specific examples of the physicochemical treatment methods include activated carbon adsorption, Fenton oxidation, ozone treatment, photocatalysis, UV irradiation, etc., and specific examples of the biological treatment methods include biological treatment using highly active microorganism strains, two-stage aeration, batch-activated sludge processes, anaerobic filtration, etc.

Although the biological treatment method is naturally friendly and is thus typically applied to wastewater treatment, it suffers from the discharge of sludge in a large amount, low treatment efficiency, and a long reaction time, and is also problematic because a large space is required and the costs of facilities and biological agents are high. Hence, industrial wastewater is mostly treated using a combination of biological treatment and physicochemical treatment.

Useful as the physicochemical treatment method for treating refractory COD materials, the Fenton oxidation process adopts a Fenton reaction, which is the oxidation of organic material published by H. J. H Fenton, 1894, in which divalent iron ions and hydrogen peroxide are allowed to react to produce a hydroxyl radical (.OH) having strong oxidation capacity, the method being known to be effective at oxidizing pollutants. However, since iron sulfate or the like used for the Fenton reaction impedes the Fenton reaction due to the high concentration of sulfuric acid ions, an excess of hydrogen peroxide is required, thus negating economic benefits, and furthermore, a large amount of sludge is generated due to the iron sulfate that is added. Moreover, the Fenton reaction is effective only under oxidation conditions and is very sensitive to pH, and thus, it is necessary to precisely control the pH.

The ozone treatment method is performed in a manner in which refractory materials are oxidized and removed using, as a very strong oxidizing agent, ozone, which is obtained by coupling three oxygen atoms with each other. Such ozone is prepared through electrical discharge, photochemical reaction, etc., and an electrical discharge process, which enables the highly efficient preparation of ozone in a large amount, is the most typical. However, ozone is an oxidizing agent that is preferably used under alkaline conditions because ozone decomposes under alkaline conditions to thus produce a hydroxyl radical that functions as an oxidizing agent. However, such ozone is not easily dissolved in water, and is sensitive to pH, like the Fenton reaction. It emits a unique pungent odor even at a low concentration of 0.02 ppm or less, and is known to be harmful to human bodies upon long-term exposure at a concentration of 0.02 ppm or more.

In addition to the physicochemical and biological treatment methods described above, there are devised electrochemical treatment methods in which an electrochemical principle is directly applied to the treatment of refractory pollutants to treat high-concentration wastewater.

The electrochemical treatment technique includes direct oxidation on an electrode surface and indirect oxidation using various reactive chemicals and OH radicals produced due to the water decomposition. However, in the treatment of wastewater, which contains refractory materials at high concentrations and in which electro-oxidation slowly progresses, the electrochemical treatment process is problematic because the processing time is long and excessive power is consumed, thus negating economic benefits.

Moreover, in addition to the electrochemical treatment method, chemical treatment methods using water and inorganic peroxides (sodium percarbonate, sodium perborate, sodium persulfate, ammonium persulfate, chromium persulfate, and sulfuric acid dihydrazine) have been proposed, and are effective at decreasing the amounts of refractory COD-causing pollutants but utilize expensive chemicals, most of which are imported, making it difficult to ensure economic benefits.

SUMMARY

Accordingly, the present invention has been made keeping in mind the above problems encountered in the related art, and an object of the present invention is to provide a resource-recycling-type method and apparatus for treating industrial wastewater, in which, in the treatment of industrial wastewater containing nitrogen compounds and refractory COD-causing pollutants, an oxidizing agent is autonomously produced using ammonia gas stripped from wastewater and is then added back to the wastewater, thus economically treating the wastewater without the need to purchase an expensive oxidizing agent.

Another object of the present invention is to provide a resource-recycling-type method and apparatus for treating industrial wastewater, in which the treatment of the wastewater through the autonomous production of an oxidizing agent may be performed in combination with other wastewater treatment processes, thereby increasing treatment efficiency.

In order to solve conventional problems and accomplish the above objects, the present invention provides a resource-recycling-type method of treating industrial wastewater using an oxidizing agent produced from wastewater, suitable for use in decreasing amounts of nitrogen pollutants (T-N), including ethanolamine compounds and ammonia nitrogen ($NH_3$—N), and refractory COD-causing pollutants in industrial wastewater, comprising: stripping ammonia from raw wastewater; producing sodium persulfate in a manner in which the stripped ammonia is placed in a scrubber and added with a sulfuric acid solution diluted to 5 to 50 wt % to thus recover ammonium sulfate concentrated to 5 to 45 wt %, after which the recovered ammonium sulfate and a sulfuric acid solution are fed into an electrochemical conversion unit comprising a diaphragm-type electrical reactor having an ion exchange membrane to produce ammonium persulfate, after which the produced ammonium persulfate is allowed to react with sodium hydroxide in a reaction chamber; and performing chemical treatment in a manner in which the produced sodium persulfate is added back to the raw wastewater from which ammonia was stripped, thus removing the nitrogen pollutants (T-N) and the refractory COD-causing pollutants.

In a preferred embodiment, producing the sodium persulfate comprises stripping ammonia generated during a reaction using a gas-stripping unit to thus recover concentrated ammonium sulfate, or further stripping the ammonia so as to be converted into nitrogen.

In a preferred embodiment, the diaphragm-type electrical reactor comprises an anode configured such that a conductive base is coated with at least one selected from among platinum (Pt), iridium (Ir), ruthenium (Ru), tantalum (Ta), tin (Sn) and boron-doped diamond, and a cathode composed of at least one selected from a material used for the anode, titanium (Ti), nickel (Ni), graphite, lead (Pb) and zirconium (Zr), and a surface of the anode or the cathode is in a mesh or plate form.

In a preferred embodiment, stripping the ammonia from the raw wastewater comprises adding the raw wastewater with a NaOH aqueous solution so that the raw wastewater has a pH of 9 to 13, and then stripping the ammonia using a gas-stripping unit.

In a preferred embodiment, the resource-recycling-type method further comprises performing intermediate treatment, which comprises physicochemical treatment using a pH control and coagulation chamber in a manner in which the raw wastewater from which ammonia was stripped is added with at least one selected from among an aluminum sulfate-based flocculant, an iron sulfate-based flocculant, an inorganic flocculant and an organic flocculant and thus the pH of the raw wastewater is adjusted, and the raw wastewater is added with a coagulant, so that organic materials and SS (Suspended Solid) components in the raw wastewater are coagulated, precipitated and separated, and only a supernatant is discharged, before performing the chemical treatment.

In a preferred embodiment, the intermediate treatment further comprises electrochemical treatment in a manner in which the raw wastewater composed of the supernatant is electrolyzed through a reaction for 10 to 600 min at a current density of 0.001 to 0.4 A/cm$^2$, after the physicochemical treatment.

In a preferred embodiment, the resource-recycling-type method further comprises performing electrochemical treatment in a manner in which the raw wastewater subjected to the physicochemical treatment and the chemical treatment is electrolyzed through a reaction for 10 to 600 min at a current density of 0.001 to 0.4 A/cm$^2$, thus producing a sulfur oxide radical, which is then used to additionally remove refractory pollutants.

In a preferred embodiment, the resource-recycling-type method further comprises subjecting the raw wastewater, from which ammonia was stripped, to intermediate treatment or post-treatment including at least one treatment selected from among physicochemical treatment for pH control and coagulation precipitation using at least one selected from among an aluminum sulfate-based flocculant, an iron sulfate-based flocculant, an inorganic flocculant and an organic flocculant; biological treatment using microorganisms; physical treatment via filtration and reverse osmosis (RO); electrochemical treatment via electrolysis, electro-coagulation and electro-precipitation; and advanced treatment using ozone ($O_3$), reverse electro-osmosis, UV irradiation and sonication, before or after performing the chemical treatment.

In addition, the present invention provides a resource-recycling-type apparatus for treating industrial wastewater using an oxidizing agent produced from wastewater, suitable for use in decreasing amounts of nitrogen pollutants (T-N), including ethanolamine compounds and ammonia nitrogen ($NH_3$—N), and refractory COD-causing pollutants in industrial wastewater, comprising: a gas-stripping unit for stripping ammonia from raw wastewater; a sodium persulfate production unit, comprising a scrubber configured such that ammonia stripped from the raw wastewater is allowed to react with a sulfuric acid solution diluted to 5 to 50 wt % to thus recover ammonium sulfate concentrated to 5 to 45 wt %, an electrochemical conversion unit comprising a diaphragm-type electrical reactor having an ion exchange membrane and configured such that the recovered ammonium sulfate is electrochemically reacted and thus converted into ammonium persulfate, and a chemical reaction chamber configured such that the ammonium persulfate thus produced is allowed to react with sodium hydroxide to produce sodium persulfate; and a chemical reaction unit configured such that the raw wastewater, from which ammonia was stripped using the gas-stripping unit, and the sodium persulfate produced using the sodium persulfate production unit are allowed to react so as to remove nitrogen pollutants (T-N) and refractory COD-causing pollutants.

In a preferred embodiment, the sodium persulfate production unit further comprises a gas-stripping unit for stripping ammonia generated upon producing the sodium persulfate.

In a preferred embodiment, the electrochemical conversion unit is a diaphragm-type electrical reactor comprising an anode configured such that a conductive base is coated with at least one selected from among platinum (Pt), iridium (Ir), ruthenium (Ru), tantalum (Ta), tin (Sn) and boron-doped diamond, and a cathode composed of at least one selected from a material used for the anode, titanium (Ti), nickel (Ni), graphite, lead (Pb) and zirconium (Zr), and a surface of the anode or the cathode is in a mesh or plate form.

In a preferred embodiment, the resource-recycling-type apparatus further comprises at least one of an intermediate treatment unit and a post-treatment unit disposed before or after the chemical reaction unit.

In a preferred embodiment, the intermediate treatment unit comprises a pH control and coagulation chamber for treating the raw wastewater from which ammonia was stripped, and an electrolysis chamber, which are sequentially disposed.

In a preferred embodiment, the post-treatment unit comprises an electrolysis chamber for electrolyzing the raw wastewater to produce a sulfur oxide radical having high oxidation potential.

In a preferred embodiment, the intermediate treatment unit or the post-treatment unit comprises at least one treatment unit selected from among a pH control and coagulation chamber for physicochemical treatment using at least one selected from among an aluminum sulfate-based flocculant, an iron sulfate-based flocculant, an inorganic flocculant and an organic flocculant; a reaction chamber for biological treatment using microorganisms; a filtration and reverse osmosis chamber for physical treatment through filtration and reverse osmosis (RO); an electrolysis chamber for electrochemical treatment through electrolysis, electro-coagulation and electro-precipitation; and a reaction chamber for advanced treatment using ozone ($O_3$), reverse electro-osmosis, UV irradiation and sonication.

According to the present invention, in the treatment of industrial wastewater containing nitrogen compounds and refractory COD-causing pollutants, an oxidizing agent such as sodium peroxide is autonomously produced using ammonia gas stripped from wastewater and is then added back to the raw wastewater from which ammonia was stripped, thereby economically treating refractory wastewater including ethanolamine compounds and COD (Chemical Oxygen Demand) and T-N (Total Nitrogen)-causing pollutants without the need to purchase an expensive oxidizing agent.

Also, the production of the oxidizing agent using ammonia nitrogen of wastewater is very useful in terms of resource recycling, and ammonium persulfate, most of which is imported, can be domestically produced at low cost, thus generating economic benefits.

Also, the treatment of wastewater using the autonomously produced oxidizing agent can be performed in combination with physicochemical treatment or electrochemical treatment, so that refractory wastewater including ethanolamine compounds and COD and T-N-causing pollutants can be treated, thereby achieving high wastewater treatment efficiency, and thus, the present invention is very industrially useful.

DETAILED DESCRIPTION

Hereinafter, a detailed description will be given of constructions and functions of the present invention according to embodiments thereof, with reference to the appended drawings. In the following description of the present invention, detailed descriptions of known constructions and functions incorporated herein will be omitted when they may make the gist of the present invention unclear.

Figure 1:
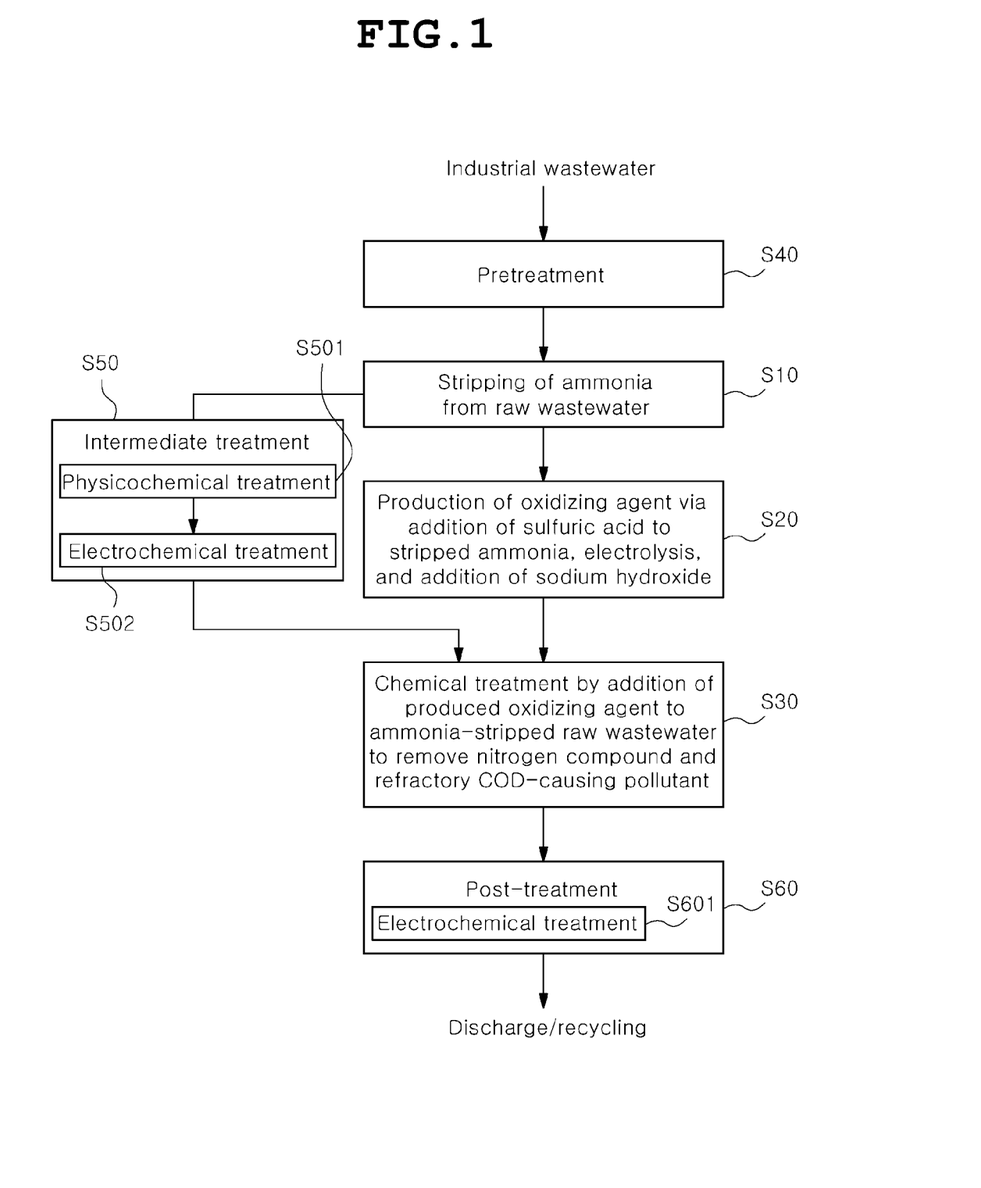
FIG. 1 is a flowchart showing a process of treating industrial wastewater using an oxidizing agent that is autonomously produced from wastewater according to the present invention.
Figure 2:
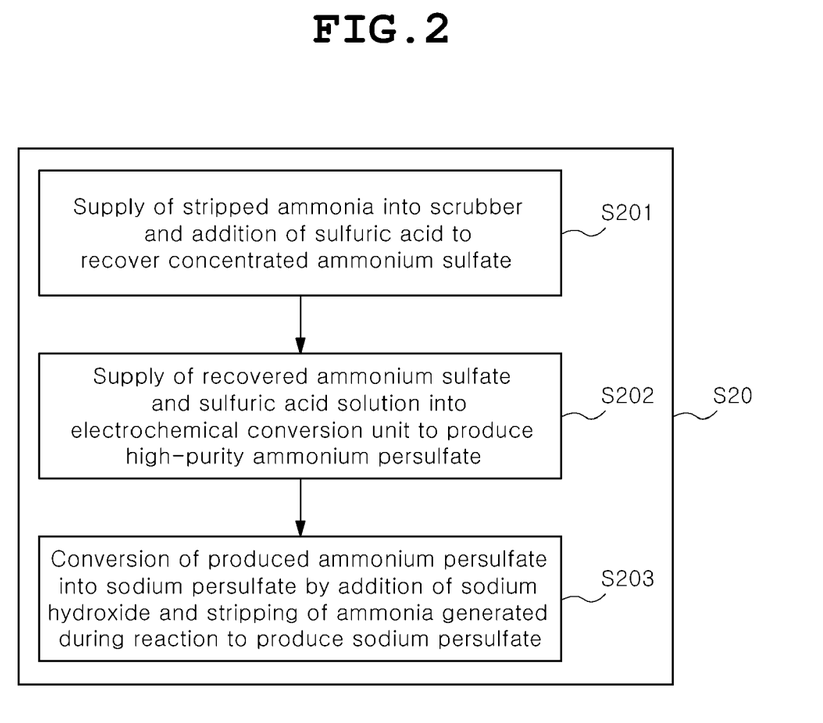
FIG. 2 is a flowchart showing the production of an oxidizing agent according to an embodiment of the present invention.
Figure 3:
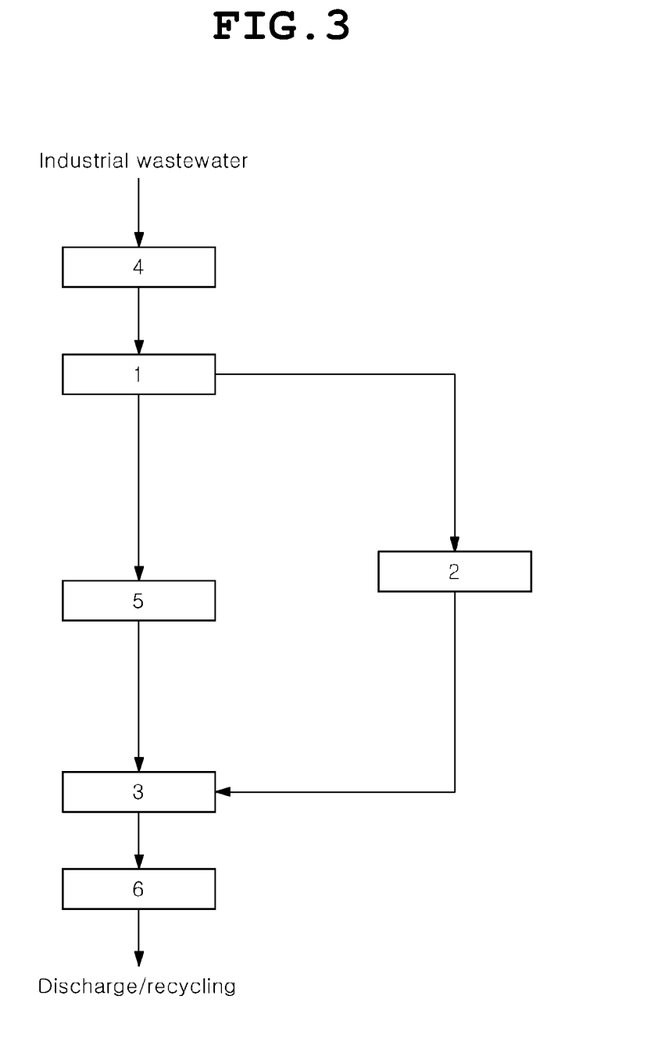
FIG. 3 shows the schematic configuration of an apparatus for treating industrial wastewater using an oxidizing agent that is autonomously produced from wastewater according to the present invention.
Figure 4:
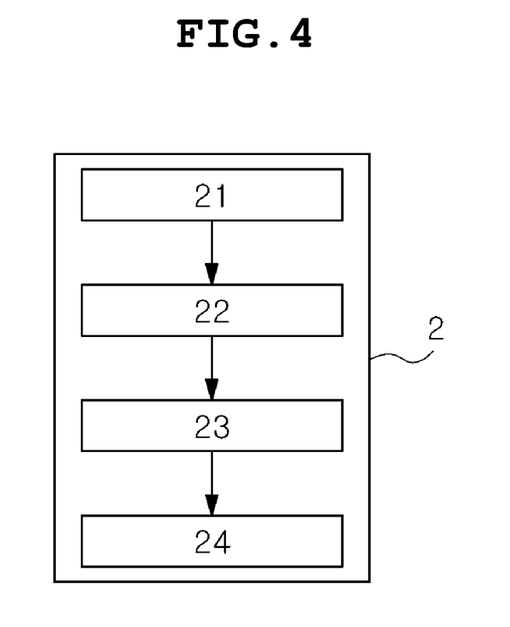
FIG. 4 shows the configuration of an oxidizing agent production unit according to an embodiment of the present invention.
Figure 5:
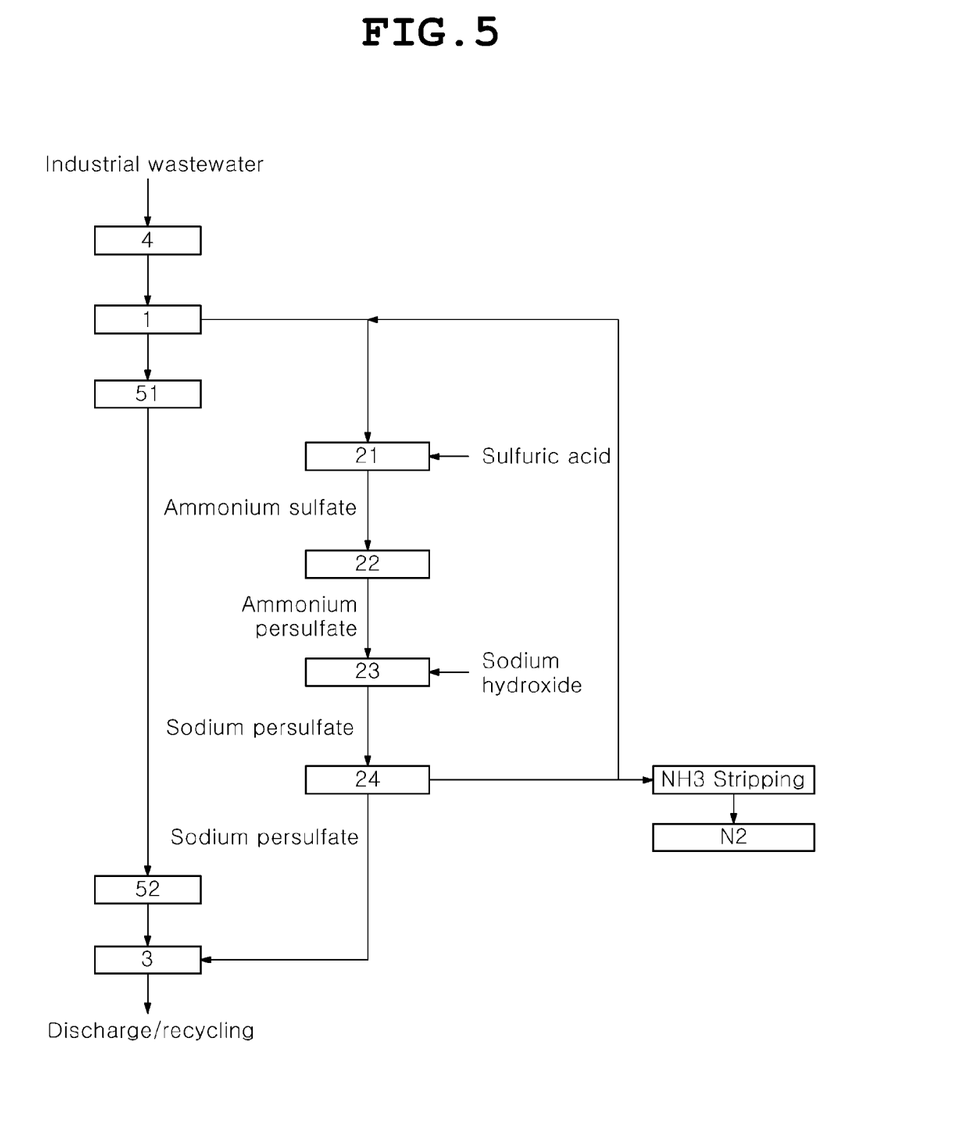
FIG. 5 shows the configuration of an apparatus for treating industrial wastewater according to Example 1 of the present invention.
Figure 6:
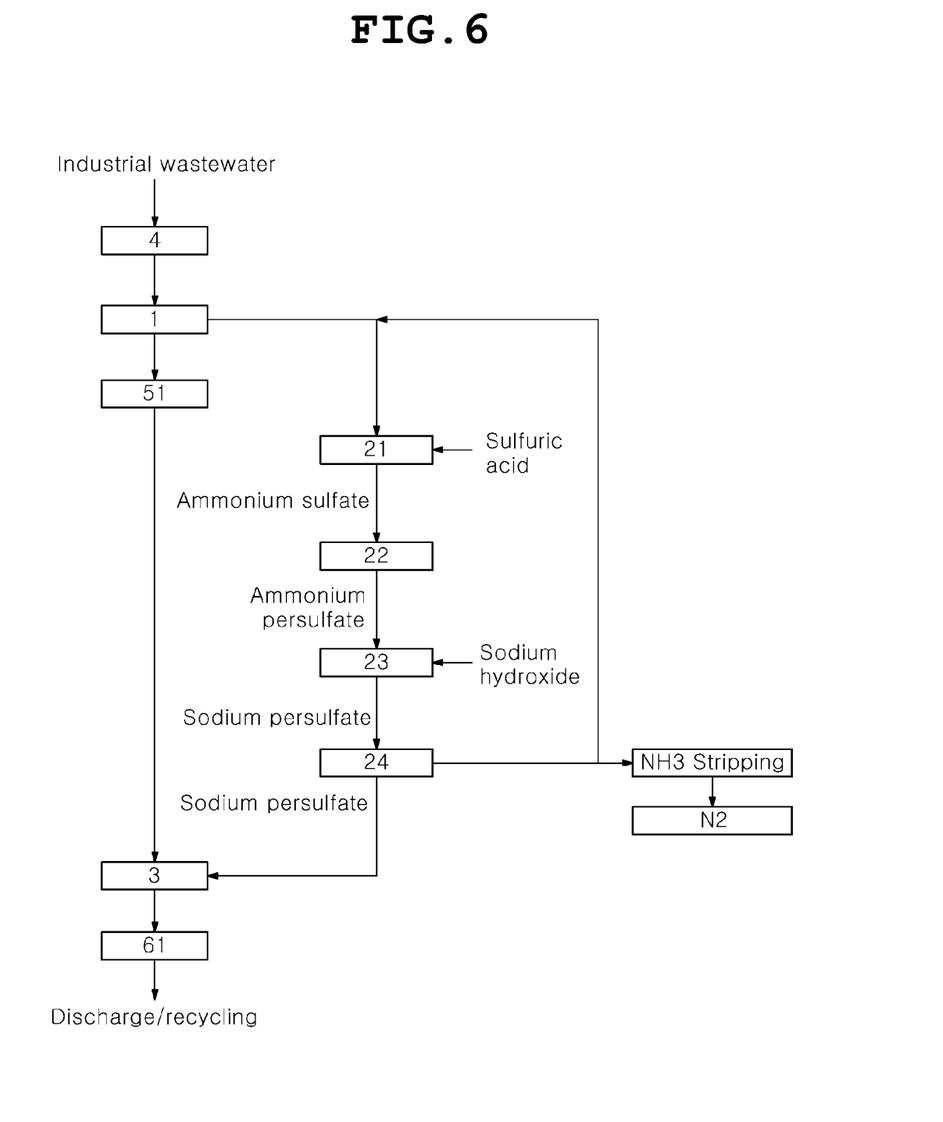
FIG. 6 shows the configuration of an apparatus for treating industrial wastewater according to Example 2 of the present invention.

FIG. 1 is a flowchart showing a process of treating industrial wastewater using an oxidizing agent that is autonomously produced from wastewater according to the present invention, FIG. 2 is a flowchart showing the production of an oxidizing agent according to an embodiment of the present invention, FIG. 3 shows the schematic configuration of an apparatus for treating industrial wastewater using an oxidizing agent that is autonomously produced from wastewater according to the present invention, FIG. 4 shows the configuration of an oxidizing agent production unit according to an embodiment of the present invention, FIG. 5 shows the configuration of an apparatus for treating industrial wastewater according to Example 1 of the present invention, and FIG. 6 shows the configuration of an apparatus for treating industrial wastewater according to Example 2 of the present invention.

With reference to FIGS. 1 to 6, the method of treating industrial wastewater according to the present invention comprises the steps of stripping ammonia from raw wastewater containing nitrogen compounds and refractory COD-causing pollutants (S10); producing an oxidizing agent by adding sulfuric acid to the stripped ammonia, performing electrolysis, and adding sodium hydroxide (S20); and performing chemical treatment by adding the produced oxidizing agent to the raw wastewater from which ammonia was stripped, thus removing nitrogen compounds and refractory COD-causing pollutants (S30).

In addition, the present invention addresses an apparatus that implements the above steps of the method, comprising: a gas-stripping unit 1, configured such that ammonia is stripped from raw wastewater fed from an industrial site using a feeding unit; an oxidizing agent production unit 2, configured such that an oxidizing agent is produced from the stripped ammonia; and a chemical reaction unit 3, configured such that the raw wastewater, from which ammonia was stripped using the gas-stripping unit 1, and the oxidizing agent, namely sodium persulfate, produced using the oxidizing agent production unit 2, are allowed to react so as to remove nitrogen compounds and refractory COD-causing pollutants.

The raw wastewater, which is to be treated in the present invention, that is, nitrogen compounds and refractory COD-causing pollutants, may include aromatic benzene ring compounds, such as chlorobenzene, nitrobenzene, decahydronaphthalene, benzene, cresol, xylene, tetrahydronaphthalene, tetrahydrofuran, toluene, phenol, ethylphenol, ethylbenzene, and pyridine, and halogenated organic compounds, such as trichloroethylene, tetrachloroethylene, perchloroethylene, and pentachlorophenol. Such raw wastewater may be industrial wastewater containing refractory COD-causing pollutants, such as wastewater from fiber-dyeing or paper-making processes, secondary system wastewater from power plants and nuclear power plants, and ethanolamine (ETA)-based wastewater from water treatment systems of CPPs, the industrial wastewater having $COD_{Mn}$ of 1000 to 5000 mg/L, T-N of 1000 to 5000 mg/L, and $NH_3$—N of 1000 to 5000 mg/L.

The method of the invention may further comprise a pretreatment step (S40) of removing impurities from raw wastewater or coagulating impurities, before the step of stripping ammonia from raw wastewater (S10). This pretreatment step may be conducted using any one selected from among a chemical treatment process using at least one chemical, a biological treatment process, a physicochemical treatment process, and an electrochemical treatment process, and such an additional treatment step, which is not limited to the above processes, may be performed before the step of stripping ammonia from raw wastewater, whereby the raw wastewater may be pretreated to thus effectively decrease COD.

The above chemical treatment is a typical pretreatment process, different from the step of producing sodium persulfate that is used for chemical treatment, as will be described later.

A pretreatment unit 4, which is used to perform the pretreatment step, may include, but is not limited to, physical means such as a screen, a filter, etc., chemical means such as a flocculant, a coagulant, an antifoaming agent, an oxidizing agent, etc., and other means such as microorganisms.

Also, the raw wastewater, from which ammonia was stripped in the step of stripping ammonia from raw wastewater (S10), may be subjected to an intermediate treatment step (S50) comprising a physicochemical treatment step (S501), before the chemical treatment step (S30).

The physicochemical treatment step (S501) may be performed using a pH control and coagulation chamber 51, whereby a polyaluminum chloride (PAC) solution, serving as the coagulant, is added to the raw wastewater from which ammonia was stripped, so that the pH of the raw wastewater is adjusted to fall within the range from 3 to 9, and at least one selected from among an anionic coagulant, a cationic coagulant, an amphoteric coagulant, and a nonionic coagulant is added, whereby organic materials and SS (Suspended Solid) components in the raw wastewater are coagulated, precipitated and separated, and only the supernatant is then discharged.

The flocculant may include an aluminum sulfate-based flocculant, such as polyaluminum chloride (PAC) or aluminum sulfate, an iron sulfate-based flocculant, such as ferrous sulfate or ferric sulfate, a typical inorganic flocculant, or a typical organic flocculant.

In the present invention, an electrochemical treatment step (S502) for electrolyzing the raw wastewater subjected to the physicochemical treatment step (S501) of the intermediate treatment step (S50) may be further performed immediately before the chemical treatment step (S30).

The electrochemical treatment step (S502) may be performed using an electrolysis chamber 52. The electrodes used for the electrolysis chamber include the anode configured such that a titanium (Ti) base is coated with at least one selected from among of iridium (Ir), ruthenium (Ru), tantalum (Ta) and tin (Sn) as a main ingredient, and the cathode may be a titanium (Ti) electrode. The current density applied upon electrolysis may fall within the range from 0.001 to 0.4 $A/cm^2$, and the reaction time may be set within the range from 10 to 600 min.

This step is mainly performed to remove nitrogen compounds (T-N) from the raw wastewater composed of the supernatant and also to partially decrease COD.

The current density and the reaction time are represented by the range from the minimum to the maximum in typical electrochemical treatment.

The electrodes may be spaced apart from each other at an interval of about 4 to 100 mm depending on the water quality and reaction conditions.

Also, the present invention is not limited only to the intermediate treatment step (S50) described above but may include at least one treatment step selected from among a physicochemical treatment step for pH control and coagulation precipitation using at least one selected from among an aluminum sulfate-based flocculant, an iron sulfate-based flocculant, and an inorganic flocculant; a biological treatment step using microorganisms; a physical treatment step via filtration and reverse osmosis (RO); an electrochemical treatment step via electrolysis, electro-coagulation and electro-precipitation; and an advanced treatment step using ozone ($O_3$), reverse electro-osmosis, UV irradiation and sonication.

An intermediate treatment unit 5, which is used to perform the intermediate treatment step (S50), may include at least one treatment unit selected from among a pH control and coagulation chamber 51 for physicochemical treatment using at least one selected from among an aluminum sulfate-based flocculant, an iron sulfate-based flocculant, an inorganic flocculant and an organic flocculant; a reaction chamber for biological treatment using microorganisms; a filtration and reverse osmosis chamber for physical treatment via filtration and reverse osmosis (RO); an electrolysis chamber for electrochemical treatment via electrolysis, electro-coagulation and electro-precipitation; and a reaction chamber for advanced treatment using ozone ($O_3$), reverse electro-osmosis, UV irradiation and sonication.

Also, the present invention may include, as a post-treatment step (S60), an electrochemical treatment step (S601) for additionally removing refractory pollutants using a sulfur oxide radical resulting from electrolyzing the wastewater subjected to the physicochemical treatment step (S502) and the chemical treatment step (S30). This step is performed in a manner in which the wastewater, subjected to chemical treatment by the addition of sodium persulfate, is further electrolyzed using an electrolysis unit, thus producing a sulfur oxide radical having high oxidation potential, thereby removing more refractory pollutants.

An electrolysis chamber 61 may be used for the electrochemical treatment step (S601). As the electrodes for electrolysis used for the electrolysis chamber, the anode is configured such that a titanium (Ti) base is coated with at least one selected from among iridium (Ir), ruthenium (Ru), tantalum (Ta) and tin (Sn) as a main ingredient, and the cathode may be a titanium (Ti) electrode. The current density applied upon electrolysis may fall in the range of 0.001 to 0.4 A/cm$^2$, and the reaction time may be set within the range from 10 to 600 min, depending on the electrical conductivity of the wastewater and the concentration of pollutants.

Also, the present invention is not limited only to the aforementioned post-treatment step but may include at least one treatment step selected from among a physicochemical treatment step for pH control and coagulation precipitation using at least one selected from among an aluminum sulfate-based flocculant, an iron sulfate-based flocculant, an inorganic flocculant and an organic flocculant; a biological treatment step using microorganisms; a physical treatment step via filtration and reverse osmosis (RO); an electrochemical treatment step using electrolysis, electro-coagulation and electro-precipitation; and an advanced treatment step using ozone ($O_3$), reverse electro-osmosis, UV irradiation and sonication.

A post-treatment unit 6, which is used to perform the post-treatment step, may include at least one treatment unit selected from among a pH control and coagulation chamber for physicochemical treatment using at least one selected from among an aluminum sulfate-based flocculant, an iron sulfate-based flocculant, an inorganic flocculant and an organic flocculant; a reaction chamber for biological treatment using microorganisms; a filtration and reverse osmosis chamber for physical treatment via filtration and reverse osmosis (RO); an electrolysis chamber for electrochemical treatment via electrolysis, electro-coagulation and electro-precipitation; and a reaction chamber for advanced treatment using ozone ($O_3$), reverse electro-osmosis, UV irradiation and sonication.

When all the above treatment steps of the present invention are performed in this way, most nitrogen compounds and refractory COD-causing pollutants are removed from the firstly fed raw wastewater, and thus water treated to a level satisfying effluent quality standards may be discharged or reused in industrial sites.

Below is a description of individual steps of the present invention.

In the step of stripping ammonia (S10), ammonia gas is stripped using a gas-stripping unit 1 from ammonia nitrogen contained in the raw wastewater fed by means of a submersible pump, a centrifugal pump or a natural falling member.

As the gas-stripping unit, at least one selected from among a liquid-spraying device, a diffuser-type stripping device and a heating or low-temperature stripping device may be used, and a pH-increasing process, a temperature-increasing process or both may be performed, thereby completing gas stripping. In addition thereto, any gas-stripping process and unit may be used without limitation, so long as gas stripping may be performed.

In the gas-stripping process using the gas-stripping unit 1, the fed raw wastewater is added with a NaOH aqueous solution so that its pH is adjusted to 9 or more, and preferably 10 to 11, after which gas is stripped therefrom. Under such conditions, ammonia gas that is dissolved in water is mostly vaporized.

The step of producing the oxidizing agent (S20) via the addition of sulfuric acid to the stripped ammonia, electrolysis and then the addition of sodium hydroxide is carried out as follows.

Specifically, the stripped ammonia is fed into a scrubber 21 and is then added with sulfuric acid and thus recovered in the form of concentrated ammonium sulfate (S201). Here, a sulfuric acid solution diluted to 5 to 50 wt %, and preferably 30 to 40 wt %, is introduced into the scrubber 21, so that ammonium sulfate is finally concentrated to 5 to 45 wt %, and preferably 20 to 40 wt %.

The ammonium sulfate thus recovered is fed together with a sulfuric acid solution into an electrochemical conversion unit 22, thus producing high-purity ammonium persulfate (S202).

Here, ammonium sulfate, sulfuric acid and the like are electrolyzed using a diaphragm-type electrolyzer as the electrochemical conversion unit 22, and are then converted into ammonium persulfate by means of an ion exchange membrane.

In the electrochemical conversion unit 22 for the electrochemical reaction, the anode is configured such that a conductive base is coated with at least one selected from among platinum (Pt), iridium (Ir), ruthenium (Ru), tantalum (Ta), tin (Sn) and boron-doped diamond (BDD), and the cathode may include the material used for the anode, nickel (Ni), graphite, lead (Pb), or zirconium (Zr), which are used alone or in combination. The electrode surface may be provided in the form of a mesh or a plate. The electrodes may be spaced apart from each other at an interval of 3 to 100 mm, and preferably 5 to 500 mm in consideration of the applied voltage. The current applied to the electrodes for electrolysis is set such that the current density falls in the range of 0.001 to 1.0 A/cm$^2$, and preferably 0.2 to 0.6 A/cm$^2$, whereby ammonium persulfate (APS) may be produced through the electrochemical reaction.

The ammonium persulfate (APS) thus produced may be separated and purified through a reduced pressure process, a low-temperature process or a combination thereof, but is not suitable for the purpose of the present invention. Hence, in the present invention, appropriately concentrated liquid ammonium persulfate (APS) is used to produce sodium persulfate in subsequent procedures.

Accordingly, the ammonium persulfate thus produced is added with sodium hydroxide in an amount suitable for the equivalent of ammonium persulfate and is thus converted into sodium persulfate as the oxidizing agent to be used in the subsequent chemical treatment step (S30), and ammonia generated during the reaction is stripped using a gas-stripping unit, thereby producing sodium persulfate (S203).

Sodium hydroxide (NaOH), which is used to convert the concentrated ammonium persulfate (APS) into sodium persulfate (SPS) so as to treat wastewater containing high concentrations of COD-causing pollutants, may be provided in the form of diluted NaOH or a NaOH powder.

As such, ammonia, which is generated during the preparation of sodium persulfate by adding ammonium persulfate with sodium hydroxide, may be stripped and then recirculated to the concentration step using the scrubber, or alternatively may be discharged, further stripped and then converted into nitrogen gas.

The sodium persulfate production unit 2 of the present invention, which is used to perform the step of producing the oxidizing agent (S20), comprises: a scrubber 21, configured such that ammonia stripped from the raw wastewater is allowed to react with the fed sulfuric acid and is thus recovered in the form of concentrated ammonium sulfate (AS); an electrochemical conversion unit 22, configured such that the recovered ammonium sulfate is converted into ammonium persulfate (APS) through an electrochemical reaction; a chemical reaction chamber 23, configured such that the produced ammonium persulfate is allowed to react with sodium hydroxide so as to produce sodium persulfate (SPS); and a gas-stripping unit 24 for stripping ammonia generated upon the production of sodium persulfate.

In the chemical treatment step (S30), the oxidizing agent, namely sodium persulfate (SPS), which is autonomously produced via the step of producing the oxidizing agent (S20), is allowed to react with the raw wastewater that is fed into a chemical reaction unit 3 serving as the reaction chamber.

The sodium persulfate (SPS) or the sodium persulfate (SPS) solution, produced via the step of producing the oxidizing agent (S20), may be directly added in an amount suitable for the concentration of pollutants to be removed from the raw wastewater from which ammonia was stripped.

In the present invention, the physical distances between the units for the individual steps or the concentrations or properties of intermediate products are not limited.

A better understanding of the present invention is obtained through preferred examples and comparative examples.

Example 1

The wastewater treatment apparatus used in Example 1 is depicted in FIG. 5. The raw wastewater used in Example 1, which simulates secondary system wastewater generated from power plants, nuclear power plants, etc., and particularly ethyleneamine (ETA)-based wastewater generated from water treatment systems of CPPs, was formulated to have $COD_{Mn}$ of 4,000 mg/L, T-N of 4,147 mg/L, and $NH_3$—N of 1,980 mg/L.

The raw wastewater was adjusted to have a pH of 10.5 using a 45 wt % NaOH aqueous solution and heated to 60° C. using a diffuser-type stripping device so that ammonia was stripped for 180 min.

Thereafter, the raw wastewater from which ammonia had been stripped was subjected to a physicochemical treatment step using a pH control and coagulation chamber 51 in a manner in which 2 mL/L of a polyaluminum chloride (PAC) solution was added and thus the pH of the raw wastewater was adjusted, and an anionic coagulant diluted to a concentration of 0.2 wt % was added at 1 mL/L such that organic materials and SS (Suspended Solid) components in the raw wastewater were coagulated, precipitated and separated, whereby only the supernatant was used as raw wastewater in subsequent procedures.

The raw wastewater composed of the supernatant thus obtained was electrolyzed using an electrolysis chamber 52. As the electrodes for electrolysis, the anode was configured such that a titanium (Ti) base was coated with all of iridium (Ir), ruthenium (Ru), tantalum (Ta) and tin (Sn), and the cathode was a titanium (Ti) electrode, and the reaction was carried out for 200 min at a current density of 0.025 A/cm$^2$, after which the treatment efficiency was observed.

The ammonia gas stripped from the raw wastewater was recovered in the form of ammonium sulfate by the addition of a diluted sulfuric acid solution using a small laboratory-scale scrubber 21, and the recovered ammonium sulfate was concentrated to 25 wt % and was then converted into ammonium persulfate through an electrochemical reaction using, as an electrochemical conversion unit 22, a diaphragm-type electrical reactor. As the electrodes for electrolysis, the anode was a mesh-type platinum (Pt) electrode, and the cathode was a plate-type nickel (Ni) electrode, and the electrodes were spaced apart from each other at an interval of 5 mm. Furthermore, the amount of current applied to the electrodes was set such that the current density was 0.3 A/cm$^2$, and the reaction was carried out for 300 min, thus yielding an ammonium persulfate (APS) solution at a conversion rate of 40%.

In a chemical reaction chamber 23, the ammonium persulfate (APS) solution was added with a 45 wt % sodium hydroxide (NaOH) solution at an equivalent ratio of 1:2, thus easily obtaining sodium persulfate (SPS), which was then subjected to testing and analysis, and the concentration thereof was measured. The sodium persulfate (SPS) thus obtained was fed to the raw wastewater stored in a reaction chamber serving as a chemical reaction unit so as to perform chemical treatment.

As is apparent from the results of Table 1 below, $COD_{Mn}$ was decreased by 97%, T-N was decreased by 98%, and $NH_3$—N was decreased by 100%.

TABLE 1

Results of treatment of wastewater containing high concentrations of pollutants in Example 1

| | Analysis of water quality in each wastewater treatment step (mg/L) | | | | |
|---|---|---|---|---|---|
| No. | Classification | Raw wastewater | After $NH_3$ stripping and 1$^{st}$ chemical treatment | Electro-oxidation | Addition of SPS after electro-oxidation | Treatment efficiency (%) |
| 1 | $COD_{Mn}$ | 4000 | 3120 | 1310 | 126 | 97 |
| 2 | T—N | 4147 | 1275 | 92 | 89 | 98 |
| 3 | $NH_3$—N | 1980 | 175 | 15 | N.D. | 100 |

N.D.: Not Detected

Example 2

The wastewater treatment apparatus used in Example 2 is depicted in FIG. 6. The raw wastewater used in Example 2 was the same as in Example 1.

The raw wastewater was adjusted to have a pH of 10.5 using a 45 wt % NaOH aqueous solution and heated to 60° C. using a diffuser-type stripping device so that ammonia was stripped for 180 min.

Thereafter, the raw wastewater from which ammonia had been stripped was subjected to a physicochemical treatment step using a pH control and coagulation chamber 51 in a manner in which 2 mL/L of a polyaluminum chloride (PAC) solution was added and thus the pH of the raw wastewater was adjusted, and an anionic coagulant diluted to a concentration of 0.2 wt % was added at 1 mL/L such that organic materials and SS (Suspended Solid) components in the raw wastewater were coagulated, precipitated and separated, whereby only the supernatant was used as raw wastewater in subsequent procedures.

The ammonia gas stripped from the raw wastewater was recovered in the form of ammonium sulfate by the addition of a diluted sulfuric acid solution using a small laboratory-scale scrubber 21, and the recovered ammonium sulfate was concentrated to 25 wt % and then converted into ammonium persulfate through an electrochemical reaction using a diaphragm-type electrical reactor. As the electrodes for electrolysis, the anode was a mesh-type platinum (Pt) electrode and the cathode was a plate-type nickel (Ni) electrode, and the electrodes were spaced apart from each other at an interval of 5 mm. Furthermore, the amount of current applied to the electrodes was set such that the current density was 0.3 A/cm$^2$, and the reaction was carried out for 300 min, thus yielding an ammonium persulfate (APS) solution at a conversion rate of 40%.

In a chemical reaction chamber, the ammonium persulfate (APS) solution was added with a 45 wt % sodium hydroxide (NaOH) solution at an equivalent ratio of 1:2, thus easily obtaining sodium persulfate (SPS), which was then subjected to testing and analysis and the concentration of which was measured. The sodium persulfate (SPS) was then fed into a reaction chamber serving as a chemical reaction unit so as to perform chemical treatment for allowing SPS to react with the raw wastewater composed of the supernatant that had been subjected to the step of pH control and coagulation of impurities.

Thereafter, the raw wastewater subjected to the chemical treatment was further electrolyzed. As the electrodes for electrolysis, the anode was configured such that a titanium (Ti) base was coated with iridium (Ir), ruthenium (Ru), tantalum (Ta) and tin (Sn) as main ingredients, and the cathode was a titanium (Ti) electrode, and the reaction was carried out for 200 min at a current density of 0.025 A/cm$^2$, after which the treatment efficiency was observed.

As is apparent from the results of Table 2 below, $COD_{Mn}$ was decreased by 92%, T-N was decreased by 79%, and $NH_3$—N was decreased by 99%. The treatment efficiency of Example 2 was lower than that of Example 1 within significant ranges in the treatment of pollutants, other than the treatment of T-N, in Example 2, but the treatment of T-N was poor.

TABLE 2

Results of treatment of wastewater containing high concentrations of pollutants in Example 2

| | | Analysis of water quality in each wastewater treatment step (mg/L) | | | |
|---|---|---|---|---|---|
| No. | Classification | Raw wastewater | After NH$_3$ stripping and 1$^{st}$ chemical treatment | Addition of SPS | Electro-oxidation after addition of SPS | Treatment efficiency (%) |
| 1 | COD$_{Mn}$ | 4000 | 3120 | 2140 | 336 | 92 |
| 2 | T—N | 4147 | 1275 | 1107 | 855 | 79 |
| 3 | NH$_3$—N | 1980 | 175 | 26 | 12 | 99 |

Comparative Example 1

Figure 7:
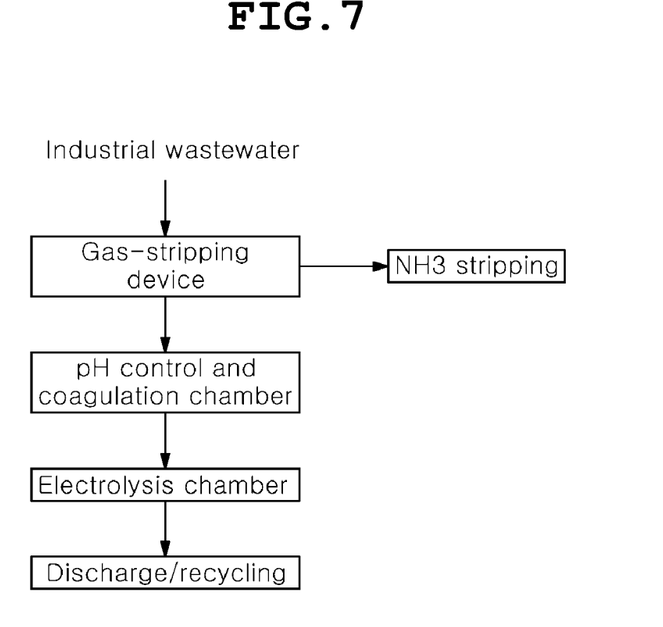
FIG. 7 shows the configuration of an apparatus for treating industrial wastewater according to Comparative Example 1.

The wastewater treatment apparatus used in Comparative Example 1 is depicted in FIG. 7. The raw wastewater used in Comparative Example 1 was the same as the raw wastewater used in Examples 1 and 2.

The raw wastewater was adjusted to have a pH of 10.5 using a 45 wt % NaOH aqueous solution, and heated to 60° C. using a diffuser-type stripping device so that ammonia was stripped for 180 min.

Thereafter, the raw wastewater from which ammonia had been stripped was subjected to a physicochemical treatment step using a pH control and coagulation chamber 51 in a manner in which 2 mL/L of a polyaluminum chloride (PAC) solution was added and thus the pH of the raw wastewater was adjusted, and an anionic coagulant diluted to a concentration of 0.2 wt % was added at 1 mL/L such that organic materials and SS (Suspended Solid) components in the raw wastewater were coagulated, precipitated and separated, whereby only the supernatant was used as raw wastewater in subsequent procedures.

Thereafter, the raw wastewater composed of the supernatant thus obtained was electrolyzed in an electrolysis chamber. As the electrodes for electrolysis, the anode was configured such that a titanium (Ti) base was coated with iridium (Ir), ruthenium (Ru), tantalum (Ta) and tin (Sn) as main ingredients, and the cathode was a titanium (Ti) electrode, and the reaction was carried out for 200 min at a current density of 0.025 A/cm$^2$, after which the treatment efficiency was observed.

As is apparent from the results of Table 3 below, $COD_{Mn}$ was decreased by 59%, T-N was decreased by 97%, and $NH_3$—N was decreased by 99%. Compared to Examples 1 and 2, the treatment of COD was very poor in Comparative Example 1.

TABLE 3

Results of treatment of wastewater containing high
concentrations of pollutants in Comparative Example 1

Analysis of water quality in each wastewater treatment step (mg/L)

| No. | Classification | Raw wastewater | After $NH_3$ stripping and $1^{st}$ chemical treatment | Electrolysis for 200 min | Treatment efficiency (%) |
|---|---|---|---|---|---|
| 1 | $COD_{Mn}$ | 4000 | 3120 | 1650 | 59 |
| 2 | T-N | 4147 | 1275 | 120 | 97 |
| 3 | $NH_3$—N | 1980 | 175 | 12 | 99 |

Comparative Example 2

Figure 8:
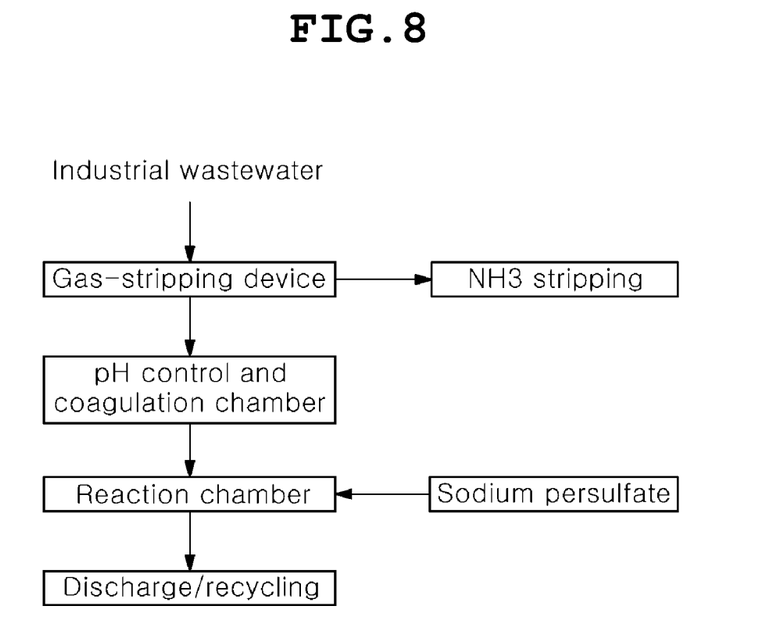
FIG. 8 shows the configuration of an apparatus for treating industrial wastewater according to Comparative Example 2.

The wastewater treatment apparatus used in Comparative Example 1 is depicted in FIG. 8. The raw wastewater used in Comparative Example 2 was the same as the raw wastewater used in Examples 1 and 2 and Comparative Example 1.

The raw wastewater was adjusted to have a pH of 10.5 using a 45 wt % NaOH aqueous solution and heated to 60° C. using a diffuser-type stripping device so that ammonia was stripped for 180 min.

Thereafter, the raw wastewater from which ammonia had been stripped was subjected to a physicochemical treatment step using a pH control and coagulation chamber 51 in a manner in which 2 mL/L of a polyaluminum chloride (PAC) solution was added and thus the pH of the raw wastewater was adjusted, and an anionic coagulant diluted to a concentration of 0.2 wt % was added at 1 mL/L such that organic materials and SS (Suspended Solid) components in the raw wastewater were coagulated, precipitated and separated, whereby only the supernatant was used as raw wastewater in subsequent procedures.

Thereafter, commercially available sodium persulfate (SPS) was dissolved in 25 wt % pure water, and 2500 to 20,000 ppm (corresponding to 2.5 to 20 g/L) thereof based on the weight of sodium persulfate (SPS) was introduced into a reaction chamber containing the raw wastewater from which ammonia had been stripped, whereby chemical treatment was performed.

As is apparent from the results of Table 4 below, $COD_{Mn}$ was decreased by 92%, T-N was decreased by 80%, and $NH_3$—N was decreased by 99%. The treatment of T-N was insufficient in Comparative Example 2.

Examples 1 and 2 according to the present invention provide a combined wastewater treatment method and apparatus in which a peroxide useful as the oxidizing agent, that is, sodium persulfate (SPS), is prepared using ammonia stripped from the raw wastewater, and is then added back to the raw wastewater from which ammonia was stripped, so that chemical treatment is performed, and simultaneously, the raw wastewater is subjected to physicochemical treatment or electrolysis. In the treatment of wastewater using the peroxide, the addition of excess peroxide is essential. In this case, COD was effectively decreased with an increase in the amount of the chemical that was added, but the decrease in T-N was insufficient. On the other hand, in the treatment with only electrolysis, the decrease in COD was insufficient. Thereby, as in Example 1 or 2, the combination of chemical treatment in which the oxidizing agent is autonomously produced from the wastewater and then added back and electrochemical treatment can be found to be preferable.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF THE REFERENCE NUMERALS IN THE DRAWINGS (1, 24): gas-stripping unit
(2): sodium persulfate production unit
(3): chemical reaction unit
(4): pretreatment unit
(5): intermediate treatment unit
(6): post-treatment unit

TABLE 4

Results of treatment of wastewater containing high
concentrations of pollutants in Comparative Example 2

Analysis of water quality in each wastewater treatment step (mg/L)

| No. | Classification | Raw wastewater | After $NH_3$ stripping and $1^{st}$ chemical treatment | SPS 2500 ppm | SPS 5000 ppm | SPS 10000 ppm | SPS 20000 ppm | Treatment efficiency (%) |
|---|---|---|---|---|---|---|---|---|
| 1 | $COD_{Mn}$ | 4000 | 3120 | 3090 | 2850 | 2010 | 324 | 92 |
| 2 | T—N | 4147 | 1275 | 1250 | 1150 | 1084 | 824 | 80 |
| 3 | $NH_3$—N | 1980 | 175 | 155 | 105 | 45 | 16 | 99 |

(21): scrubber
(22): electrochemical conversion unit
(23): reaction chamber
(51): pH control and coagulation chamber
(52, 61): electrolysis chamber

The invention claimed is:

1. A resource-recycling method of treating industrial wastewater using an oxidizing agent produced from wastewater to decrease amounts of a nitrogen pollutant (T-N), including an ethanolamine compound and ammonia nitrogen ($NH_3$—N), and a refractory COD (Chemical Oxygen Demand)-causing pollutant in industrial wastewater, the method comprising:
    stripping ammonia from raw wastewater;
    producing sodium persulfate in a manner in which the stripped ammonia is placed in a scrubber and added with a sulfuric acid solution diluted to 5 to 50 wt % to thus recover ammonium sulfate concentrated to 5 to 45 wt %, after which the recovered ammonium sulfate and a sulfuric acid solution are fed into an electrochemical conversion unit comprising a diaphragm electrical reactor having an ion exchange membrane to produce ammonium persulfate, after which the produced ammonium persulfate is allowed to react with sodium hydroxide in a reaction chamber; and
    performing chemical treatment in a manner in which the produced sodium persulfate is added back to the raw wastewater from which ammonia was stripped, thus removing the nitrogen pollutant (T-N) and the refractory COD-causing pollutant.

2. The resource-recycling method of claim 1, wherein the producing the sodium persulfate comprises stripping ammonia generated during a reaction using a gas-stripping unit to thus recover concentrated ammonium sulfate, or further stripping the ammonia so as to be converted into nitrogen.

3. The resource-recycling method of claim 1, wherein the diaphragm electrical reactor comprises an anode configured such that a conductive base is coated with at least one selected from among platinum (Pt), iridium (Jr), ruthenium (Ru), tantalum (Ta), tin (Sn) and boron-doped diamond, and a cathode composed of at least one selected from a material used for the anode, titanium (Ti), nickel (Ni), graphite, lead (Pb) and zirconium (Zr), and a surface of the anode or the cathode is in a mesh or plate form.

4. The resource-recycling method of claim 1, wherein the stripping the ammonia from the raw wastewater comprises adding the raw wastewater with a NaOH aqueous solution so that the raw wastewater has a pH of 9 to 13, and then stripping the ammonia using a gas-stripping unit.

5. The resource-recycling method of claim 1, further comprising performing intermediate treatment, which comprises physicochemical treatment using a pH control and coagulation chamber in a manner in which the raw wastewater from which ammonia was stripped is added with at least one selected from among an aluminum sulfate-based flocculant, an iron sulfate-based flocculant, an inorganic flocculant and an organic flocculant and thus a pH of the raw wastewater is adjusted, and the raw wastewater is added with a coagulant, so that an organic material and an SS (Suspended Solid) component in the raw wastewater are coagulated, precipitated and separated, and only a supernatant is discharged, before the performing the chemical treatment.

6. The resource-recycling method of claim 5, wherein the intermediate treatment further comprises electrochemical treatment in a manner in which the raw wastewater composed of the supernatant is electrolyzed through a reaction for 10 to 600 min at a current density of 0.001 to 0.4 A/cm$^2$, after the physicochemical treatment.

7. The resource-recycling method of claim 5, further comprising performing electrochemical treatment in a manner in which the raw wastewater subjected to the physicochemical treatment and the chemical treatment is electrolyzed through a reaction for 10 to 600 min at a current density of 0.001 to 0.4 A/cm$^2$, thus producing a sulfur oxide radical, which is then used to additionally remove a refractory pollutant.

8. The resource-recycling method of claim 1, further comprising subjecting the raw wastewater, from which ammonia was stripped, to intermediate treatment or post-treatment including at least one treatment selected from among physicochemical treatment for pH control and coagulation precipitation using at least one selected from among an aluminum sulfate-based flocculant, an iron sulfate-based flocculant, an inorganic flocculant and an organic flocculant; biological treatment using microorganisms; physical treatment via filtration and reverse osmosis (RO); electrochemical treatment via electrolysis, electro-coagulation and electro-precipitation; and advanced treatment using ozone ($O_3$), reverse electro-osmosis, UV irradiation and sonication, before or after the performing the chemical treatment.

9. A resource-recycling apparatus for treating industrial wastewater using an oxidizing agent produced from wastewater to decrease amounts of a nitrogen pollutant (T-N), including an ethanolamine compound and ammonia nitrogen ($NH_3$—N), and a refractory COD-causing pollutant in industrial wastewater, the apparatus comprising:
    a gas-stripping unit for stripping ammonia from raw wastewater;
    a sodium persulfate production unit, comprising a scrubber configured such that ammonia stripped from the raw wastewater is allowed to react with a sulfuric acid solution diluted to 5 to 50 wt % to thus recover ammonium sulfate concentrated to 5 to 45 wt %, an electrochemical conversion unit comprising a diaphragm electrical reactor having an ion exchange membrane and configured such that the recovered ammonium sulfate is electrochemically reacted and thus converted into ammonium persulfate, and a chemical reaction chamber configured such that the ammonium persulfate thus produced is allowed to react with sodium hydroxide to produce sodium persulfate; and
    a chemical reaction unit configured such that the raw wastewater, from which ammonia was stripped using the gas-stripping unit, and the sodium persulfate produced using the sodium persulfate production unit are allowed to react so as to remove the nitrogen pollutant (T-N) and the refractory COD-causing pollutant.

10. The resource-recycling apparatus of claim 9, wherein the sodium persulfate production unit further comprises a gas-stripping unit for stripping ammonia generated upon producing the sodium persulfate.

11. The resource-recycling apparatus of claim 10, wherein the electrochemical conversion unit is a diaphragm electrical reactor comprising an anode configured such that a conductive base is coated with at least one selected from among platinum (Pt), iridium (Ir), ruthenium (Ru), tantalum (Ta), tin (Sn) and boron-doped diamond, and a cathode composed of at least one selected from a material used for the anode, titanium (Ti), nickel (Ni), graphite, lead (Pb) and zirconium (Zr), and a surface of the anode or the cathode is in a mesh or plate form.

12. The resource-recycling apparatus of claim 9, further comprising at least one of an intermediate treatment unit and a post-treatment unit disposed before or after the chemical reaction unit.

13. The resource-recycling apparatus of claim 12, wherein the intermediate treatment unit comprises a pH control and coagulation chamber for treating the raw wastewater from which ammonia was stripped, and an electrolysis chamber, which are sequentially disposed.

14. The resource-recycling apparatus of claim 12, wherein the post-treatment unit comprises an electrolysis chamber for electrolyzing the raw wastewater to produce a sulfur oxide radical having high oxidation potential.

15. The resource-recycling apparatus of claim 12, wherein the intermediate treatment unit or the post-treatment unit comprises at least one treatment unit selected from among a pH control and coagulation chamber for physicochemical treatment using at least one selected from among an aluminum sulfate-based flocculant, an iron sulfate-based flocculant, an inorganic flocculant and an organic flocculant; a reaction chamber for biological treatment using microorganisms; a filtration and reverse osmosis chamber for physical treatment through filtration and reverse osmosis (RO); an electrolysis chamber for electrochemical treatment through electrolysis, electro-coagulation and electro-precipitation; and a reaction chamber for advanced treatment using ozone ($O_3$), reverse electro-osmosis, UV irradiation and sonication.

* * * * *